C. A. WYMAN.
ANIMAL TRAP.
APPLICATION FILED JAN. 31, 1910.
975,098.
Patented Nov. 8, 1910.
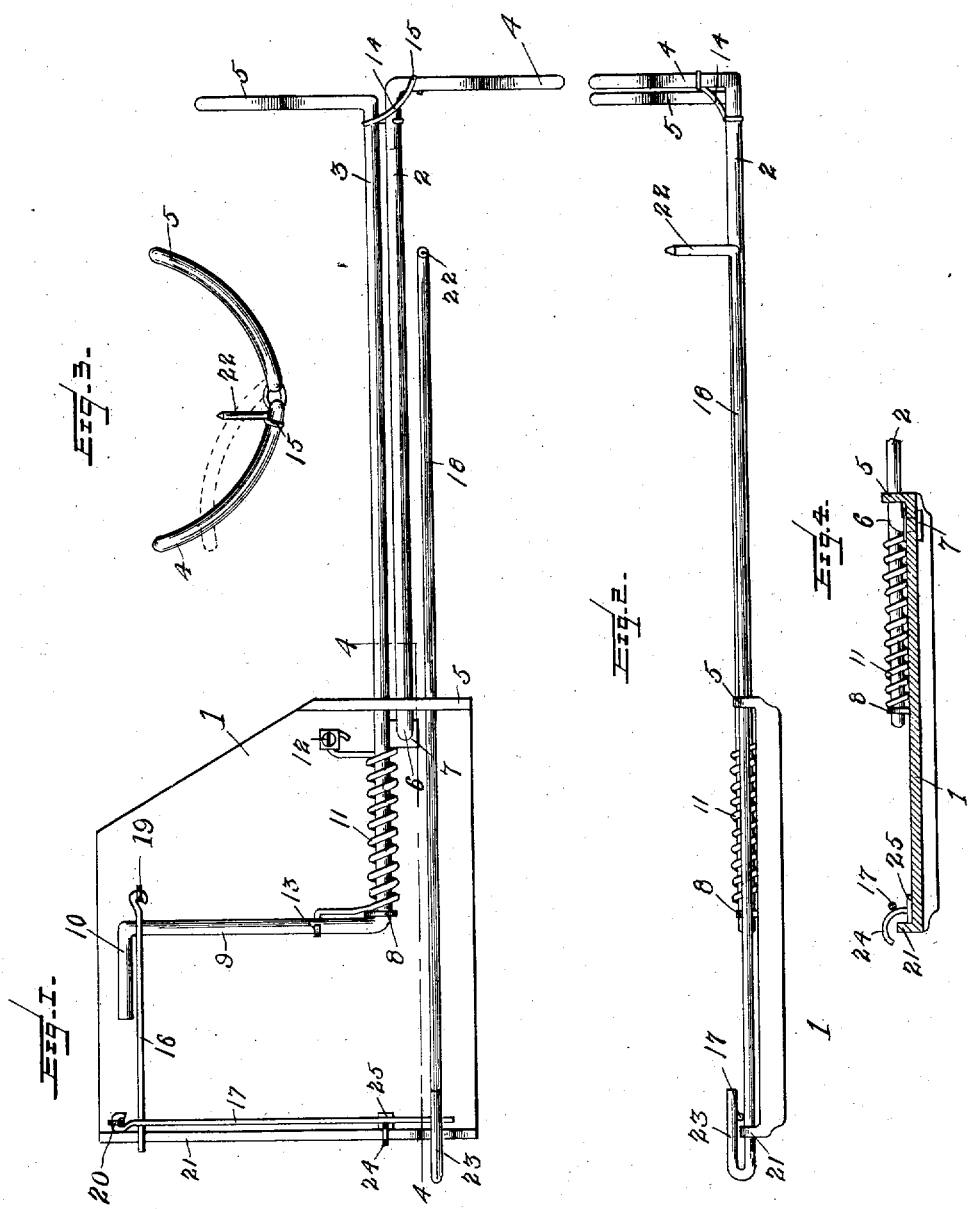
Witnesses
Ed C. Andever.
E. M. Ricketts
Inventor
Charles A. Wyman.
By Watson E. Coleman
Attorney

UNITED STATES PATENT OFFICE.

CHARLES ALBION WYMAN, OF GASTON, OREGON, ASSIGNOR OF ONE-HALF TO WILLIAM C. EMMERSON, OF GASTON, OREGON.

ANIMAL-TRAP.

975,098.  Specification of Letters Patent.  Patented Nov. 8, 1910.

Application filed January 31, 1910.  Serial No. 541,075.

*To all whom it may concern:*

Be it known that I, CHARLES A. WYMAN, a citizen of the United States, residing at Gaston, in the county of Washington and State of Oregon, have invented certain new and useful Improvements in Animal-Traps, of which the following is a specification, reference being had to the accompanying drawings.

My invention relates to improvements in animal traps, and more particularly those adapted to be placed at holes made by burrowing animals such as gophers, moles, rats, etc.

The object of the invention is to provide a simple, practical and efficient device of this character which may be set quickly with safety and convenience, and which will be without expense to operate.

With the above and other objects in view, the invention consists of the novel construction, combination and arrangement of parts, hereinafter fully described and claimed, and illustrated in the accompanying drawings in which:—

Figure 1 is a plan view of my improved trap; Fig. 2 is an edge view of the same; Fig. 3 is an end view showing the jaws, portions of the trap being omitted; and Fig. 4 is a detail longitudinal section taken on the plane indicated by the line 4—4 in Fig. 1.

My improved trap comprises a body or base 1 from which project jaw-carrying members 2, 3, adapted to be inserted in the hole or burrow made by a mole or similar animal. The base 1 is in the form of a plate, and the members 2, 3, are in the form of rods disposed in parallel relation and having at their outer ends oppositely projecting and right angularly disposed jaws 4, 5, formed preferably by bending the extremities of the rods at right angles and curving them longitudinally to a slight extent, as shown in Fig. 3. The rod 2 and jaw 4 are stationary, the inner end of the rod being secured to the base plate 1 preferably by passing said rod 2 through an upturned bearing flange 5 and then passing the right angularly bent extremity 6 of said rod through a hole in the base plate and securing it, as shown at 7 in Fig. 4. The rod 3 is in the form of a rock shaft and is adapted to rotate to swing the jaw 5 toward or over upon the jaw 4 to grip the animal between them. The inner end of the rod or shaft 3 is rotatable in an opening in the bearing flange 5 and in a bearing lug 8 provided on the base plate 1, said inner end of the rod having a right angularly bent arm 9 which forms a crank and has a bent extremity 10 forming a handle. A coil spring 11 surrounds the inner portion of the rod or shaft 3 and has one of its ends anchored at 12 to the base plate, and its other end hooked around the arm 9, as at 13 whereby said spring will tend to rotate the rod or shaft 3 in a direction to move the jaw 5 toward the jaw 4. The longitudinal axes of the jaws 4, 5, are preferably disposed in parallel planes so that the outer extremities of the jaws may swing past each other, as indicated in dotted lines in Fig. 3, thereby permitting them to more effectively grip and hold the animal; and in order to prevent the animal from springing the rods 2, 3, apart and working out from between the jaws a retaining member 14 is provided, as shown in Fig. 1. This member is preferably in the form of a clip formed by bending a piece of heavy wire around the outer portions of the rods 2, 3, and bending one of its extremities 15 around the stationary jaw 4, thereby securely fastening the wire and causing it to serve as a guide and bearing for the rotary rod or shaft 3.

The jaw 5 is adapted to be held in open position by means of a pair of levers 16, 17, and a slidable trigger 18. The lever 16 is loosely pivoted at one of its ends on the base plate 1 as shown at 19 and is adapted to swing over the crank arm 9 to hold the latter down on the base plate 1, while the lever 17 has one of its ends loosely pivoted on the base plate as shown at 20 whereby it swings in a plane at right angles to the lever 16 and is adapted to hold the free end of the latter down upon the base plate. The trigger 18 is in the form of a rod disposed parallel with the rods 2, 3, and slidable in an opening in the bearing flange 5, and in a similar bearing flange 21 on the opposite edge of the base plate. The outer end of the trigger rod 18 has an upturned portion 22 disposed close to the jaws 4, 5, whereby the animal in working through the hole or burrow and passing over said jaws will strike the projection 22 and shift the trigger rod. If desired, bait may be used on the projection or end 22 of said trigger. The other end of the trigger rod 18 is bent over upon itself to provide a hook 23 which is adapted to be moved over the free end of the lever 17 to hold the latter down, and which is adapted to be retracted from said lever when the trigger is actuated by an animal.

In order to securely hold the jaw 5 in its open position without the use of the trigger, while the trap is being set in position, I provide a holding member 24 in the form of a hook. This member is secured on the base plate 1 as shown at 25 and has an end projecting opposite to that of the hook 23, and under which end the lever 17 is adapted to be caught.

In using the trap the trigger rod 18 is retracted and the arm 9 swung down upon the base plate against the tension of the spring 11 to move the jaw 5 to its open position. The levers 16, 17, are then arranged as shown in Fig. 1 and the lever 17 engaged with the holding or keeper hook 24. The jaws 4 are then forced well into the hole or burrow of a gopher, mole or similar burrowing animal and embedded or partially embedded in the bottom thereof. When the trap is thus positioned the lever 17 is disengaged from the hook 24 and the trigger rod 18 is then moved in a direction to cause its hook 23 to engage the lever 17, and hold the latter as clearly shown in Figs. 1 and 2. When an animal passes over the jaws 4, 5, it will strike and actuate the end 22 of the trigger, thereby causing the end 23 of the latter to release the lever 17. When this happens the spring 11 will swing the rock shaft or rod 3 and the jaw 5 to cause the latter to hold the animal against the jaw 4.

From the foregoing it will be noted that the trap is of simple construction and may therefore be produced at a small cost and will be exceedingly strong and durable in use. It will be further noted that it may be readily set and may be repeatedly used so that it will be inexpensive to operate. In practice I have found it exceedingly useful for the purpose set forth.

While the preferred embodiment of the invention has been shown and described in detail, it will be understood that I do not wish to be limited to the precise construction set forth, since various changes in the form, proportion and arrangement of parts, and in the details of construction, may be resorted to within the spirit and scope of the invention.

Having thus described the invention, what is claimed is:

1. An animal trap comprising a body or base, jaw members projecting therefrom, and having at their ends, opposing jaws adapted to be inserted in the hole of a burrowing animal, one of said members being rotatable whereby its jaw may swing toward and from the other jaw, a spring for actuating the rotatable member, in one direction, an arm on said rotatable member, a lever pivoted to the body to engage said arm, and hold the movable jaw in its open position, a second lever pivoted to the body and engaged with the first lever, and the shiftable trigger co-acting with said second lever.

2. An animal trap comprising a body or base, jaw members projecting therefrom, and having at their ends opposing jaws adapted to be inserted in the hole of a burrowing animal, one of said members being rotatable whereby its jaw may swing toward and from the other jaw, a spring for actuating the rotatable member in one direction, an arm on said rotatable member, a lever pivoted to the body to engage said arm and hold the movable jaw in its open position, a second lever pivoted to the body and engaged with the first lever and a trigger slidably arranged upon the body and having means at one end to releasably engage said second lever, and means at its other end arranged adjacent to the jaws for supporting the bait.

3. An animal trap comprising a body or base, jaw members projecting therefrom and having at their ends opposing jaws adapted to be inserted in the hole of a burrowing animal, one of said members being rotatable whereby its jaw may swing toward and from the other jaw, a spring for actuating the rotatable member in one direction, a holding means for said rotatable jaw including a pair of engaged levers, and a slidable trigger having a hook to engage one of said levers and a portion disposed adjacent to said jaws.

4. An animal trap comprising a body or base, jaw members projecting therefrom and having at their ends opposing jaws adapted to be inserted in the hole of a burrowing animal, one of said members being rotatable whereby its jaw may swing toward and from the other jaw, a spring for actuating the rotatable member in one direction, a holding means for said rotatable jaw including a pair of engaged levers, a slidable trigger having a hook portion to engage one of said levers and a portion disposed adjacent to said jaws, and a keeper member adapted to receive and hold the lever while the trap is being positioned for use.

5. An animal trap comprising a base plate, rods projecting therefrom and one being rotatably mounted, gripping jaws on the outer ends of said rods, an arm upon the inner end of the rotatable rod, a spring for actuating said rotatable rod, a lever pivoted on the base for engagement with said arm, a second lever pivoted on the base to engage the first lever, and a slidable trigger rod mounted on the base and having a hook portion to engage the second lever, and a projecting portion disposed adjacent to said jaws and adapted to be actuated by an animal.

In testimony whereof I hereunto affix my signature in the presence of two witnesses.

CHARLES ALBION WYMAN.

Witnesses:
FRANK ALLEN WYMAN,
JAY G. MANN.